United States Patent

Kataoka

[11] Patent Number: 5,857,143
[45] Date of Patent: Jan. 5, 1999

[54] CHANNEL ALLOCATION METHOD USED FOR MOBILE TYPE COMMUNICATION DEVICES

[75] Inventor: Nobuhisa Kataoka, Tokyo, Japan

[73] Assignee: Mitsubishi Denki Kabushiki Kaisha, Tokyo, Japan

[21] Appl. No.: 707,765

[22] Filed: Sep. 4, 1996

[30] Foreign Application Priority Data

Feb. 19, 1996 [JP] Japan .................................. 8-030827

[51] Int. Cl.$^6$ .............................. H04B 15/00; H04Q 7/20
[52] U.S. Cl. ............................... 455/62; 455/63; 455/450
[58] Field of Search ............................. 455/62, 63, 450, 455/451, 452, 464, 509

[56] References Cited

U.S. PATENT DOCUMENTS

| | | | |
|---|---|---|---|
| 5,418,839 | 5/1995 | Knuth et al. | 455/464 |
| 5,603,092 | 2/1997 | Stjernholm | 455/63 |
| 5,625,672 | 4/1997 | Yamada | 455/450 |

OTHER PUBLICATIONS

J. Avery & J. Yamada, "A Common Air Interface for a Cellular Auxiliary Personal Communication Service" Proceedings of the 5th IEEE International Symposium . . . pp. 665–669, 1994.

H. Furukawa & Yoshihiko Akaiwa, "A Microcell Overlaid With Umbrella Cell System", Proceedings of the 44th IEEE vehicular technology Conference, pp. 1455–1459, 1994.

J. Worsham & J. Avery, "A Cellular Band Personal Communications System", Proceedings of the 2nd IEEE International Conference on Universal Personal Communications, 1993.

Y. Konishita, et al. "High Density Space Division Multiple Access" and Double Reuse of Frequency Channels, Proceedings of the 3rd IEEE International Conference . . . pp. 552–557, 1994.

J. E. Padgett, et al "Overview of Wireless Personal Communications", IEEE communications magazine, pp. 28–41, Jan., 1995.

*Primary Examiner*—Nguyen Vo
*Assistant Examiner*—Sam Bhattacharya
*Attorney, Agent, or Firm*—Wolf, Greenfield & Sacks, P.C.

[57] ABSTRACT

In an interference wave detection/study process, counters $m_i(t_j)$, $n_i(t_j)$ are set by an initial value "zero" to set the detection number of an interference wave of not less than a threshold power level per channel i and per time period ti. The $m_i(t_j)$ is updated, then the power $U_i$ of a measured interference wave is compared with the threshold value r. The $n_i(t_j)$ is updated only when $U_i \geq r$. The $n_i(t_j)$ is divided by $m_i(t_j)$ to obtain the arriving probability of an interference wave. These processes are repeated over all channels. In a channel search/allocation process, the power $U_i$ of the interference wave in the smallest $W_i(t_j)$ is compared with a value r, When $U_i(t_j) \geq r$, the channel having the second smaller $W_i(t_j)$ is selected and the above processes are repeated. it becomes a calling loss when all channels are searched. When $U_i < r$, this channel is allocated.

14 Claims, 16 Drawing Sheets

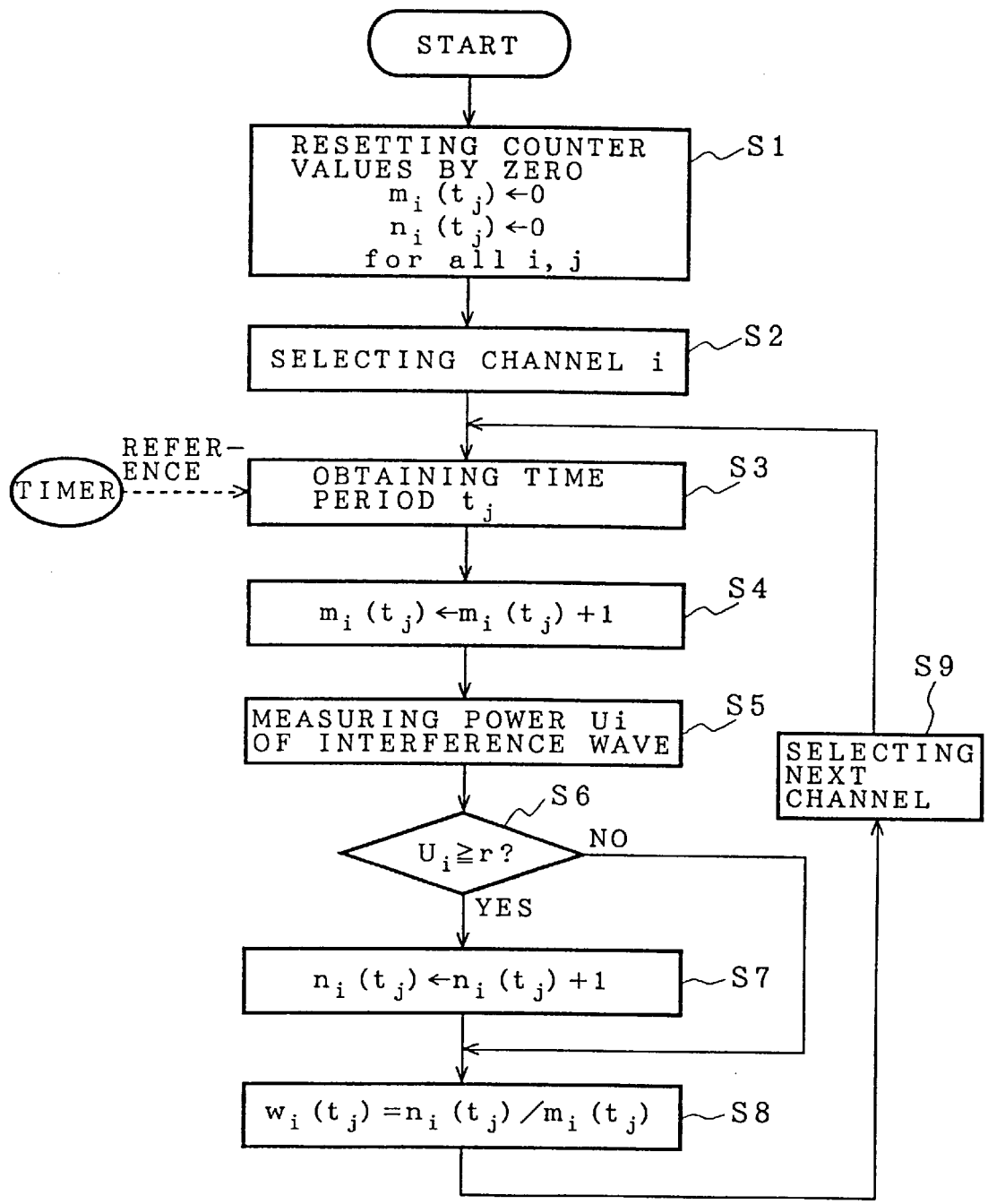

F I G. 7
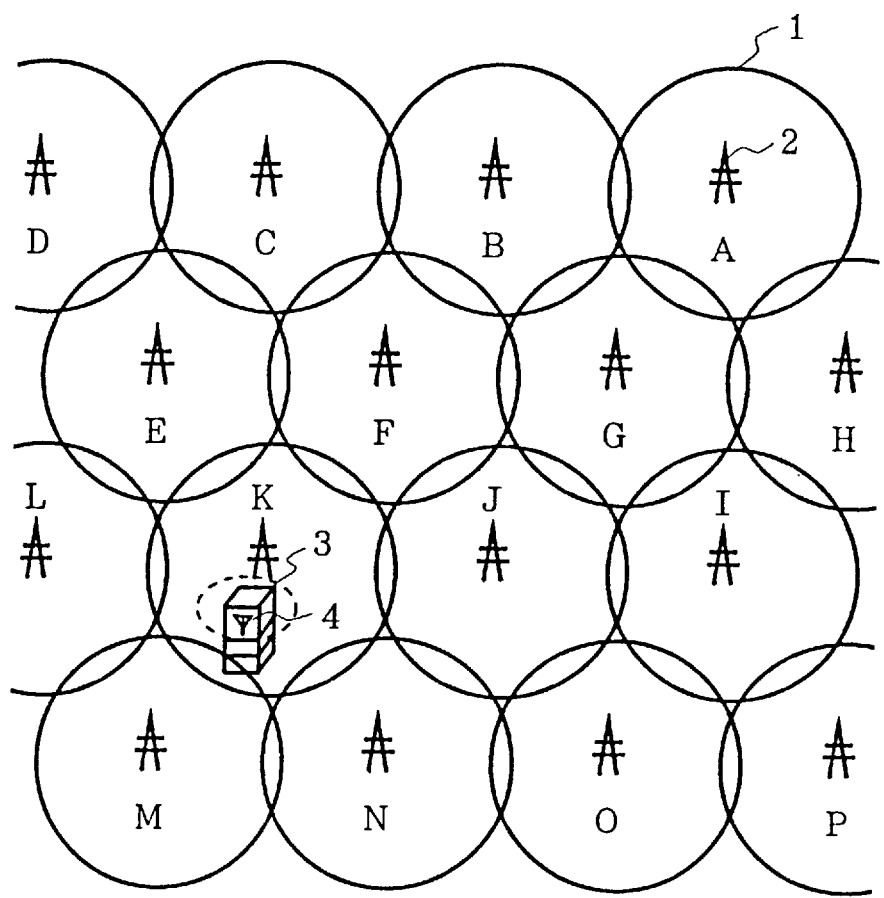

CHANNEL ALLOCATION METHOD USED FOR MOBILE TYPE COMMUNICATION DEVICES

BACKGROUND OF THE INVENTION

1. Field of the Invention

The present invention relates to a channel allocation method used for mobile type communication devices located in a system including a plurality of macros and microcells which commonly use the same frequency band, and more particularly, it relates to a channel allocation method that is capable of studying the characteristics of interference waves arrived from other cells (in a radio zone) and of searching channels according to a channel searching order that has been set and of selecting and allocating one of the channels.

2. Description of the Prior Art

There are conventional channel allocation methods for mobile type communication devices. For example, as shown in FIG. 1, the conventional technique disclosed in the following literature (1) uses a method for re-using a frequency band used by a macrocell station $2a$ by a microcell station $4a$ in a system that has already been used around United State of America. This method is referred to as "a reuse channel fixed allocation method".

(1) Y. Kinoshita et al., "HIGH DENSITY SPACE DIVISION MULTIPLE ACCESS" AND "DOUBLE REUSE OF FREQUENCY CHANNEL", Proceedings of the 3rd IEEE International Conference on Universal Personal Communications, PP.552–557, 1994).

As shown in the flow chart of FIG. 2, the conventional technique disclosed in the following literature (2) uses a method of monitoring channels just before the allocation of a channel by a microcell to be installed in an area having a strong interference in a Personal Handy-Phone System in use around Japan, and of allocating the channel after checking the existence of interferences. This method is called as "an interference avoidance channel allocation method".

(2) J. E. Padgett et al., "OVERVIEW OF WIRELESS PERSONAL COMMUNICATIONS", IEEE communications magazine, pp.28–41, January, 1995.

As shown in the flow chart of FIG.3, the conventional technique disclosed in the following literature (3) uses a method of setting a priority to each channel in relatively weak interference area in which a specified channel can be used constantly without any interference and of allocating or assigning a channel having a relatively lower interference while updating the priority of the channel when a channel is allocated or assigned to be used. This method is referenced to as "priority channel allocation method".

(3) H. Furukawa et al., "A MICROCELL OVERLAID WITH UMBRELLA CELL SYSTEM", Proceedings of the 44th IEEE vehicular technology Conference, pp.1455–1459, 1994.

As shown in the flow chart of FIGS. 4A and 4B, the conventional technique disclosed in the following literature (4) uses a method of eliminating the channel, in a channel allocation operation to select a channel to be used, in which an interference has happened once a relatively weak interference area in which a specified channel can be used constantly without causing of any interference. This method is referred to as "a channel allocation method in which any channel of the occurrence of interference is eliminated for channel allocation".

(4) J. Worsham et al., "A CELLULAR BAND PERSONAL COMMUNICATIONS SYSTEM, Proceedings of the 2nd IEEE International Conference on Universal Personal Communications, 1993.

As shown in the flow chart of FIG. 5, the conventional technique disclosed in the following literature (5) uses a method of allocating a channel as long as the number of interferences happening in this channel is not more than a predetermined number. This method is an improved method of the method disclosed in the literature (4) described above. This method is referred to as "a channel allocation method in which the interference in a channel is happened at more than predetermined times is eliminated for channel allocation".

(5) J. Avery et al., "A COMMON AIR INTERFACE FOR A CELLULAR AUXILIARY PERSONAL COMMUNICATIONS SERVICE", Proceedings of the 5th IEEE International Symposium on Personal, Indoor and Mobile Radio Communications, pp.665–669, 1994.

In the reuse channel fixed allocation method designated by the reference character (1) described above, as shown in FIG. 1, for example, a microcell installed in a building in a macrocell K uses a fixed frequency band allocated for a macrocell A which is adequately separated in distance from the microcell in order to avoid the occurrence of interference.

In the interference avoidance channel allocation method denoted by the reference character (2) described above, like the channel search/allocation processes shown in FIG. 2, first of all, a unused channel i is allocated (Step S12$a$) when a new channel allocation request is happened in a call/intracell hand-off operation (switching of a channel during calling). Then, the interference power of the channel i is measured (Step S13), and the measured power is compared with a threshold power level (Step S14). When $U_i$<r, (at Step S15, there is an interference wave), a next channel is selected when there is a channel that is not searched (Step S16), the processes described above are repeated. When there is no channel having the condition $U_i$<r after the search of all of channels are completed, the channel allocation operation enters a calling loss. At Step S14, when $U_i$<r, this channel is allocated (Step S18).

In the priority channel allocation method designated by the reference character (3), like the channel search/allocating processes as shown in FIG. 3, when a new channel allocation request is happens, first of all, the channel having the maximum priority level is selected (Step S12$b$). Then, the power level $U_i$ of the interference wave in this channel is measured (Step S13), and this power level $U_i$ is compared with a threshold power level r (Step S14). When $U_i \geq r$, the priority level of this channel is decreased (Step S14$a$), and then it is checked whether or not the all of channels are searched (Step S15). When there is un-searched channel, the channel having the next priority level is selected (Step S16$b$), and the processes described above are repeated. If there is no channel having the condition $U_i$<r after all of the channels are searched, the new channel allocation request becomes a calling loss (Step S17). Thus, the priority level of the channel in which there are the interference waves is decreased by this method. In addition, at Step S14, when $U_i$<r, the priority level of the channel is increased (Step S14$b$), and the channel is allocated (Step S18). Thus, the priority level of the channel in which there is no interference wave is increased in this method. This method can allocate channels in which there is no interference wave because the channel search operation is performed from the channel having the highest priority level to the channel having the lowest priority level in order.

In the channel allocation method in which any channel of the occurrence of interference is eliminated for channel allocation designated by the reference character (4) described above, like an interference detection process shown in FIG. 4A and a channel search/allocation process shown in FIG. 4B, first of all, unused channel is selected (Step S2). Then, the interference power of this channel is measured (Step S5), and the measured interference power level $U_i$ is compared with an threshold power level r (Step S6). At Step S6, when $U_i \geq r$, the channel i in which the interference wave is detected is eliminated from channel allocation (Step 6c) in order to avoid the occurrence of interference to a macrocell. When $U_i < r$, a next channel is selected (Step S9), and the processes described above are repeated.

When a new channel request has happened during the calling/intracell hand off operation, first of all, a channel i in the channels to be allocated is selected (Step S12c), then the interference power $U_i$ of the channel is measured (Step S13), and the measured interference power level $U_i$ is compared with an threshold power level r (Step S14). At Step S14, when $U_i \geq r$, it is detected whether or not all of the channels are searched (Step S15). When there are un-searched channels to be allocated, one channel in the un-searched channels is selected (Step S16c), then the processes described above are repeated. When there is no channel having the condition $U_i < r$, this request enters the calling loss (Step S17).

When there is the channel having the condition of $U_i < r$ (at Step S14), this channel is allocated (Step S18). In this method described above, the channel having the interference wave is eliminated from channel allocation. By using this method, no interference has happened in allocated channels.

In the channel allocation method in which the interference in a channel has happened at more than predetermined times is eliminated for channel allocation denoted by the reference character (5) described above, like an interference wave detection process shown in FIG. 5, first of all, one (a channel i) of unused channels is selected (Step S2), the interference power level $U_i$ of the channel i is measured many times at each time period (Step S5a). Then, this interference power measuring process is repeated for all of the channels and a time rate $P_i$ where the interference power level exceeds a threshold power level per time period in each channel is obtained (Step S6d, Step S9, and Step S6e). The channel whose time rate $P_i$ is not less than a predetermined time rate $P_r$ is eliminated for channel allocation (Step S6f). Thus, in this method, the channel is used for channel allocation so long as the number of interference occurrences in this channel is not more than predetermined time.

In the prior art, there are the conventional channel allocation methods (1) to (5) described above, we summarizes these methods as follows:

(1) The reuse channel fixed allocation method, as shown in FIG. 1, where selected or fixed channels are reused in the same frequency band.

(2) The interference avoidance channel allocation method, as shown in FIG. 2, where the interference avoidance allocation operation is executed only during the channel allocation operation.

(3) The priority channel allocation method, as shown in FIG. 3, where the priority level of a channel is updated only when the channel allocation is executed.

(4) The channel allocation method in which any channel of the occurrence of interference is eliminated for channel allocation, as shown in FIGS. 4A and 4B.

(5) The channel allocation method in which the interference in a channel is happened at more than predetermined times is eliminated for channel allocation, as shown in FIG. 5.

However, there are drawbacks (11) to (15) in the above conventional channel allocation methods (1) to (5), as follows:

(11) In the conventional channel allocation method (1), there is a possibility to cause an interference under a circumstance that it is easy to happen interference between microcells and macrocells when the microcells are installed at a higher floor in a building or when there are many existing macrocells to easily cause interferences.

(12) In the conventional channel allocation method (2), it can not avoid the occurrence of interference during calling because the allocation avoidance operation for the channels that have had no interference is executed only during the channel allocation operation. Therefore an intracell handoff is required so as to increase the load of a microcell station and the number of interrupts of calling is increased, so that the quality of calling is decreased.

(13) In the conventional channel allocation method (3), it can not avoid the occurrence of interference at the following channel allocation operation even if a channel priority level is high at the last channel allocation operation. In this case, the priority level must be decreased in this channel allocation operation. Therefore the channel priority level is only decreased and increased in this method, not constantly decreased. This method is used for a microcell that is installed at a lower floor (the first floor or the second floor) in a building in which the number of the occurrences of interferences to a macrocell is relatively low (relatively lower interference condition). However, by using this method, it is difficult to reduce the interference between macrocells and microcells installed in a higher floor in a building in which the number of the occurrences of interferences to the macrocells is high (higher interference condition).

(14) In the conventional channel allocation method (4), it is difficult to use this channel allocation method in a circumstance where the number of the occurrences of interferences is high (the higher interference condition), because interferences are detected in all of channels and those channels are eliminated from the channel allocation operation, so that there is no channel to be allocated in the circumstance.

(15) It is difficult to use the channel allocation method (5) in a circumstance where the number of the occurrences of interferences is higher (the higher interference condition), because there is the case that the number of channels, (each time rate indicating that the interference power is over a predetermined power level exceeds a predetermined time rate), to be allocated becomes zero.

SUMMARY OF THE INVENTION

Accordingly, an object of the present invention is, with due consideration to the drawbacks of the conventional channel allocation methods, to provide a channel allocation method (a study search channel allocation method) of a microcell for studying the characteristics of interferences arrived from macrocells and for allocating a channel to be searched based on a channel search order during the channel allocation operation under the higher interference condition in order to reduce the occurrence of interference to the macrocells as low as possible and to avoid the case that there is no channel for channel allocation.

In accordance with one aspect of the present invention, there is provided a channel allocation method used for mobile type communication devices in a system including a plurality of macrocells and microcells both use a same frequency band divided into a plurality of channels, comprising: an interference wave detection/study step of studying characteristics of interference waves arrived from said macrocells per channel and per time period; and a channel search/allocation process of searching said plurality of channels based on a channel search order which is determined based on said characteristics of arrived interference waves and of allocating one of said channels.

In accordance with a further aspect of this embodiment, in said interference wave detection/study process, a power of said interference wave is measured per channel and per time period, and a data update operation is repeated to obtain a detection number count value when a power level of said arrived interference wave is not less than a predetermined power level, and an arriving probability based on said detection number count value counted by the repeating of said data update operation is studied as the characteristic of said arrived interference waves.

In accordance with another aspect of this embodiment in said interference wave detection/study process, a power of said interference wave is measured per channel and per time period, and a data update operation is repeated to obtain a detection number count value when a power level of said arrived interference wave is not less than a predetermined power level, and an arriving probability based on said detection number count value counted by the repeating of said data update operation is weighted by a predetermined weight value based on a magnitude of said power of said interference wave studied as the characteristic of said arrived interference waves.

In accordance with another aspect of this embodiment, in said interference wave detection/study process, a power of said interference wave is measured per channel and per time period, and a data update operation is repeated to obtain a detection number count value only in a desired time period when a power level of said arrived interference wave is not less than a predetermined power level.

In accordance with another aspect of this embodiment, said detection number count value is obtained by multiplying said detection number count value in current state by a predetermined value as a forgetting factor.

In accordance with another aspect of this embodiment, in said interference wave detection/study process, said characteristic of said arrived interference wave is detected in a predetermined time period over all of said channels, or at a desired time per specified channels in said plurality of channels.

In accordance with another aspect of this embodiment, in said interference wave detection/study process, said characteristic of said arrived interference wave is detected in a predetermined time period over all of said channels, or at a desired time for specified channels in said plurality of channels.

In accordance with another aspect of this embodiment, in said channel search/allocation process, a channel having said arriving probability of said interference wave arrived from other macrocells is not less than a predetermined value is eliminated from a channel allocation operation to allocate a channel and a number of said channels is controlled based on a blocking probability i. e. an occurrence rate of calling loss to failure calling.

In accordance with a further aspect of this embodiment, the number of searchings is used instead of said arriving probability of said interference wave.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are flow charts showing the operation of a channel allocation method used for mobile type communication devices as the first embodiment of the present invention.

FIG. 7 is a system configuration of mobile type communication devices using the channel allocation method shown in FIGS. 6A and 6B.

DESCRIPTION OF THE PREFERRED EMBODIMENTS

Hereinafter, preferred embodiments according to the present invention will be explained with reference to accompanying drawings.

Embodiment 1.

Figure 1:
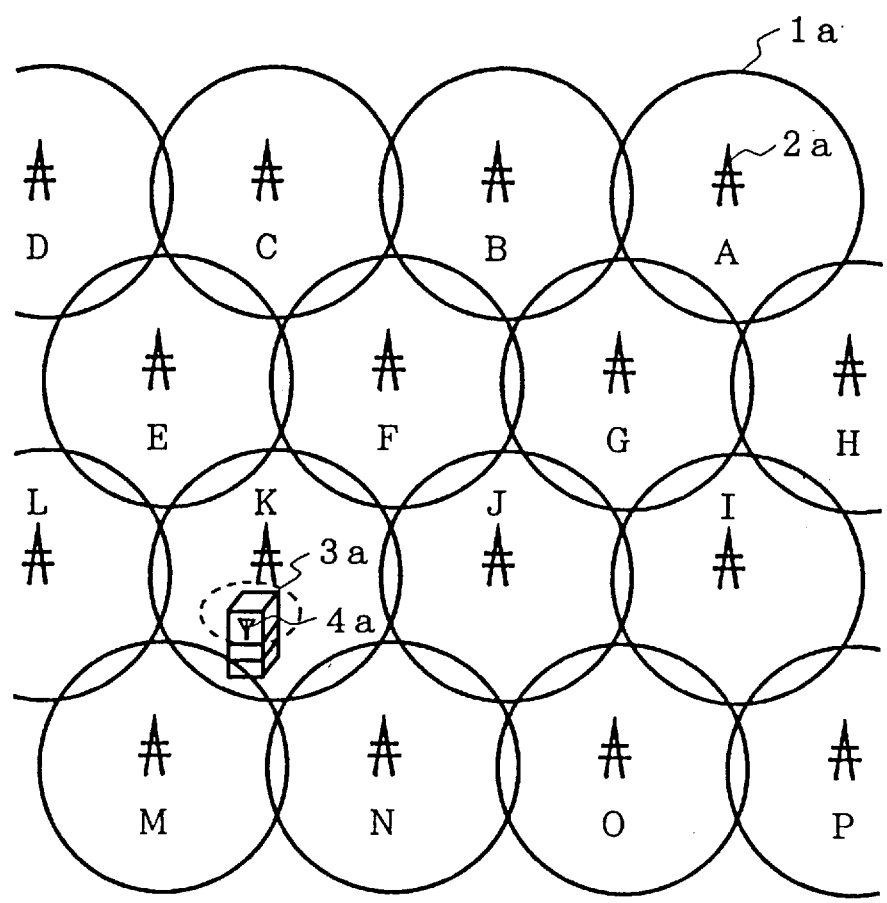
FIG. 1 is a system configuration in which a conventional channel allocation method is used for conventional mobile type communication devices.
Figure 2:
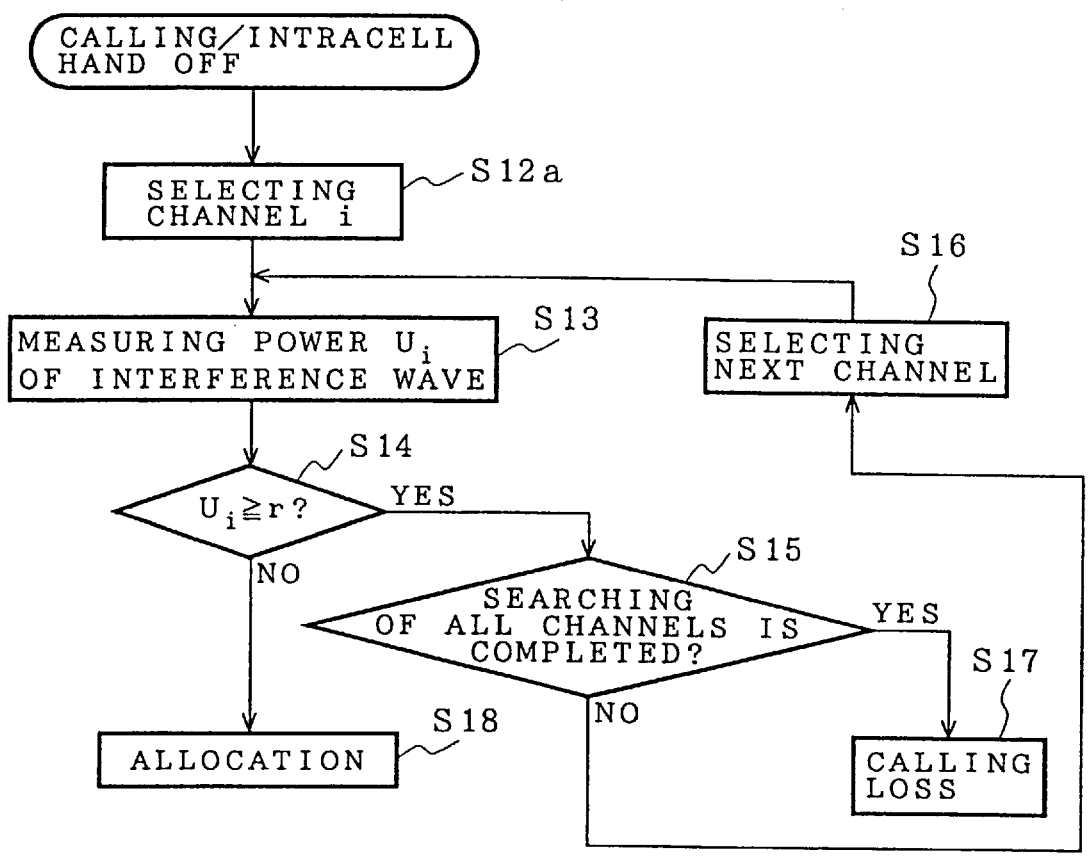
FIG. 2 is a flow chart showing the operation of another conventional channel allocation method used for conventional mobile type communication devices.
Figure 3:
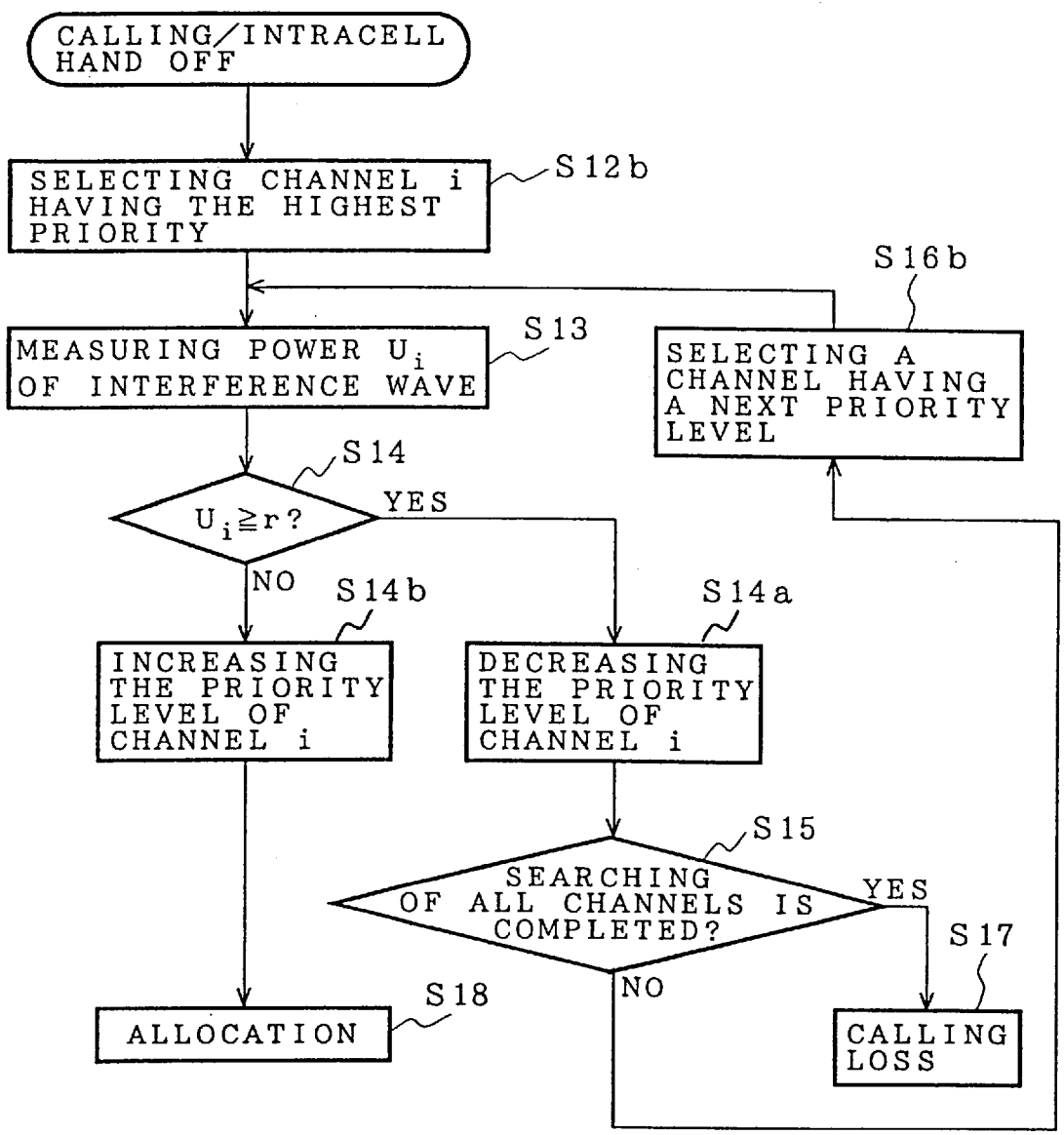
FIG. 3 is a flow chart showing the operation of another conventional channel allocation method used for conventional mobile type communication devices.
Figure 4A:
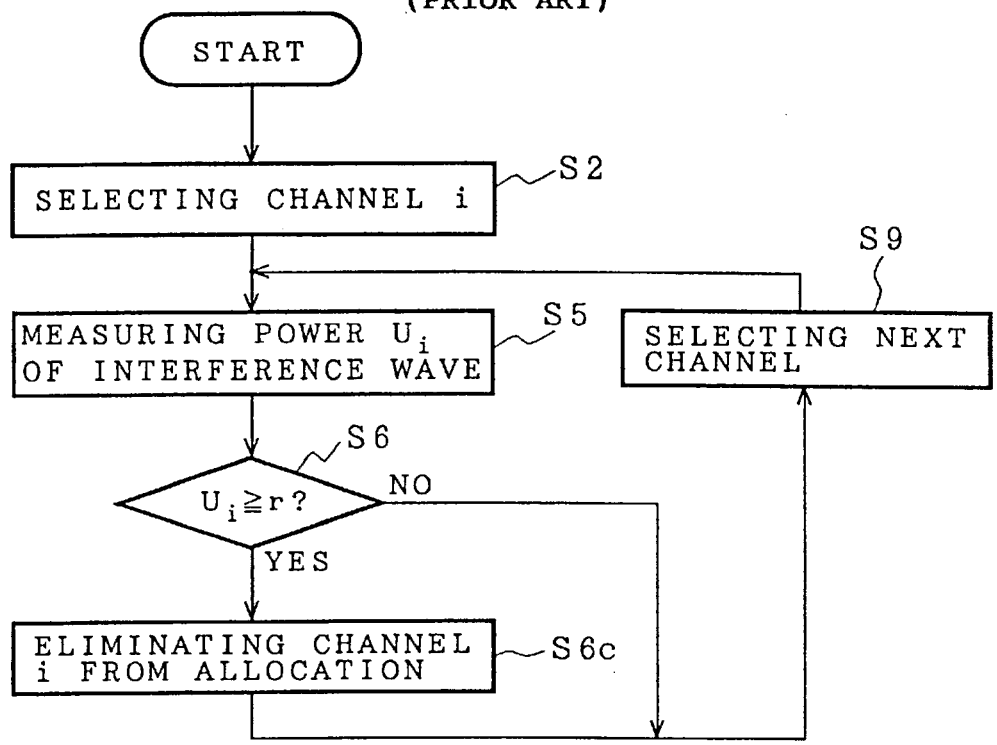
FIGS. 4A and 4B are flow charts showing the operation of another conventional channel allocation method used for conventional mobile type communication devices.
Figure 4B:
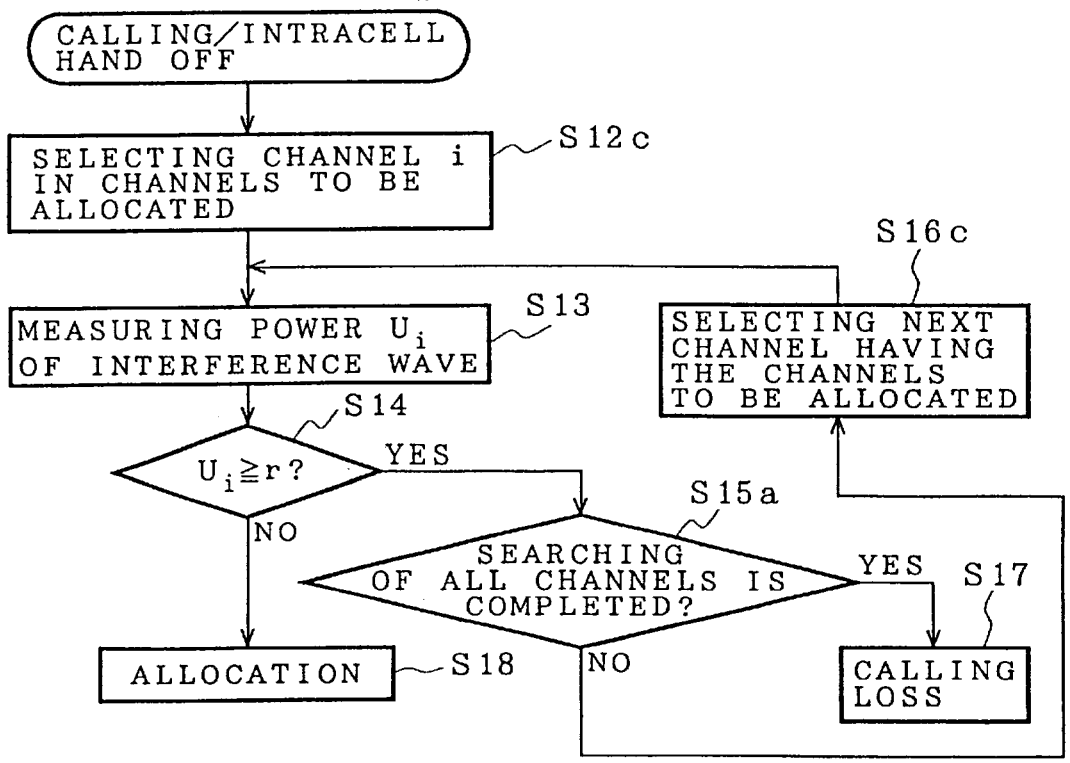
Figure 5:
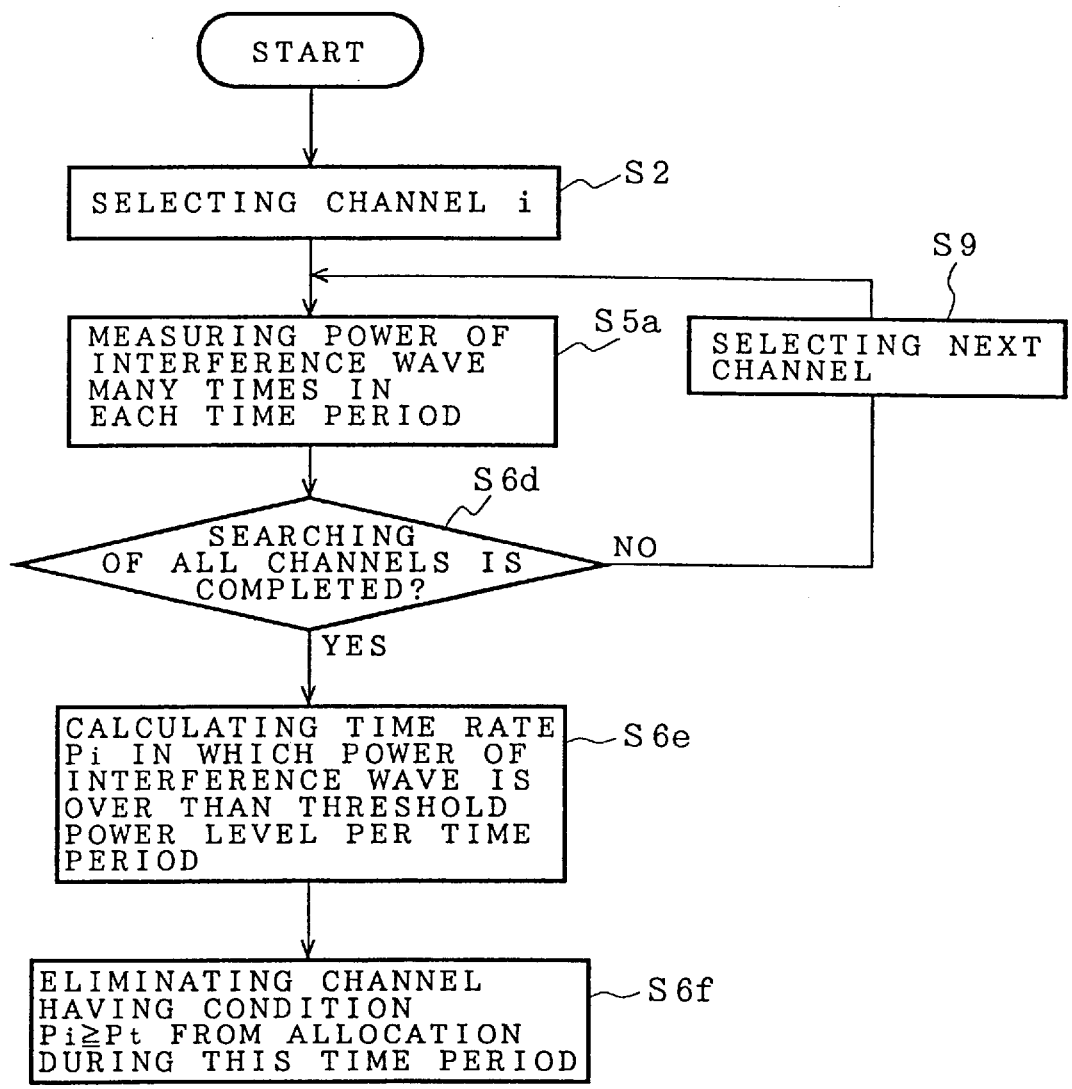
FIG. 5 is a flow chart showing the operation of another conventional channel allocation method used for conventional mobile type communication devices.
Figure 6B:
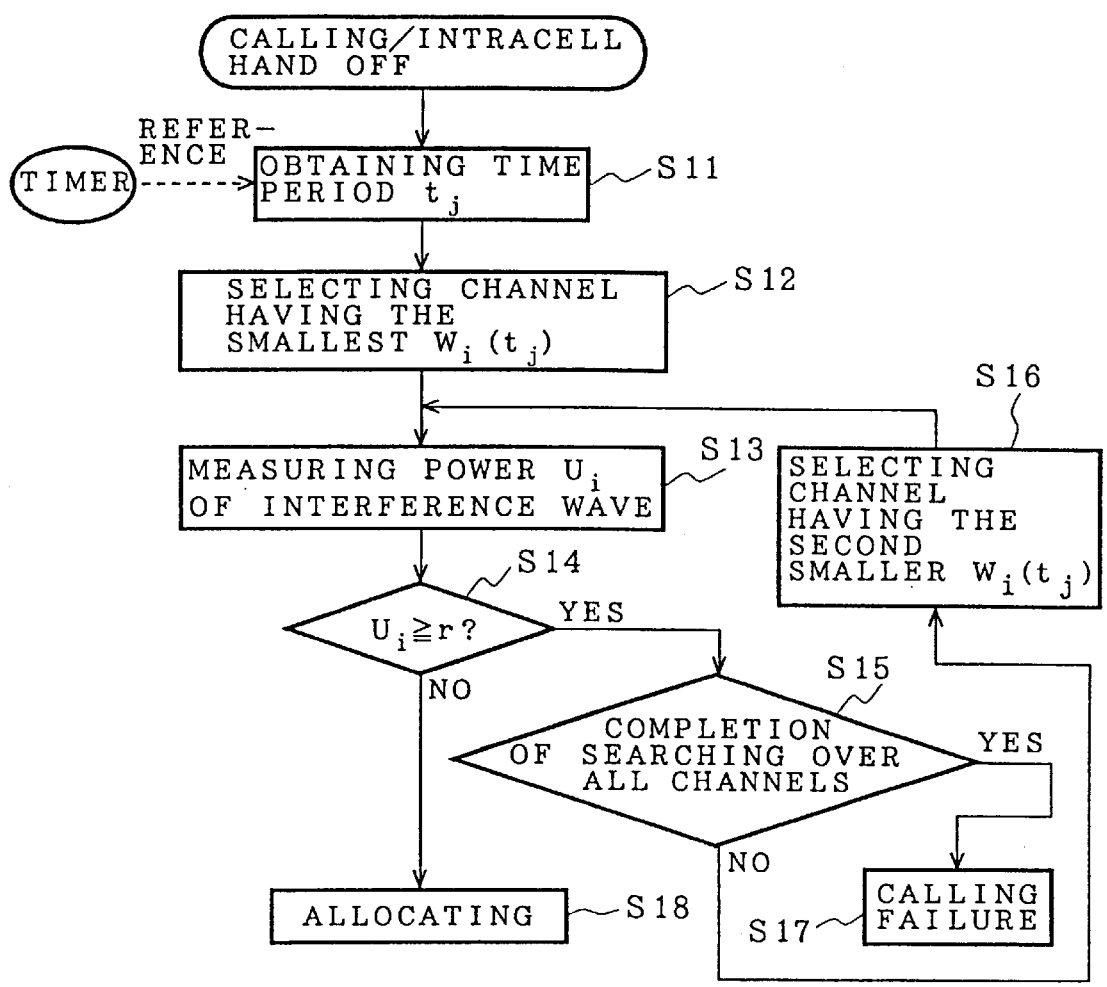

FIGS. 6A and 6B are flow charts showing the operation of a channel allocation method used for mobile type communication devices as the first embodiment of the present invention. FIG. 7 is a system configuration of the mobile type communication devices using the channel allocation method shown of the first embodiment shown in FIGS. 6A and 6B.

In the channel allocation method of the first embodiment shown in FIGS. 6A and 6B, characteristics (or change patterns) of interference waves arrived from the macrocells are studied for each channel and for each time period in order to allocate a channel to be used based on a channel search order which has been set by the studied change patterns of interference waves (hereinafter referred to as "a study search channel allocation method").

In the channel allocation method used for mobile type communication devices of the first embodiment, the channel having the minimum probability value of arriving an interference wave from macrocells whose power level exceeds a threshold power level is allocated per time period on demand without existing channels to be allocated even if a microcell is installed in a circumstance where the number of the occurrences of interferences is high (the higher interference condition). Thereby, the number of the occurrences of interferences to macrocells can be reduced to the minimum value as small as possible.

First of all, in the study search channel allocation method in the channel allocation method of the first embodiment, the value indicating the number of measuring for the channel "i" in each time period $t_j$ and the value of the counter $m_i(t_j)$ and $n_i(t_j)$ are reset by zero before a study operation (Step S1) during calling, like the interference wave detection/study processes shown in FIG. 6A and the channel search/allocation processes shown in FIG. 6B.

Next, one channel "i" in unused channels is selected (Step S2). For example, each time period tj is generated by using an inside timer in a microcell station 4 shown in FIG. 7. The number of the time periods becomes 24 when one day is divided by 1 hour. Then, the value of the counter $m_i(t_j)$ is increased by one (Steps S2 to S4).

The power $U_i$ of the interference wave in the channel "i" is measured (Step S5), the measured interference power $U_i$ is then compared with the threshold power level "r" (Step S6). When $U_i \geq r$ ("Yes" in Step S6), the counter value $n_i(t_j)$ is increased by 1 (Step S7). When $U_i < r$ ("No" in Step S6), the counter value $n_i(t_j)$ is not increased.

The interference wave detection number $n_i(t_j)$ for the channel "i" is divided by the measuring number $m_i(t_j)$ for this channel "i" in order to obtain the arriving probability $W_i(t_j)$ of interference waves of not less than the threshold power level "r" per time period tj and per the channel "i" (Step S8). The detection number $n_i(t_j)$ indicates the frequency of the occurrence of an arrived interference wave, per time period tj, whose power level is not less than the predetermined power level.

A next channel is selected (Step S9), and the processes described above are then repeated continuously for all of the channels. Thereby, the change patterns of interference waves arrived from macrocells can be studied or stored as $W_i(t_j)$ per channel.

When a new channel allocation request is happened during calling/intracell hand off states, first of all, like the talking operation described above, each time period tj is obtained. Then, the channel "i" having the minimum arriving probability $W_i(t_j)$ indicating the probability of the rate of arrived interference waves each being of not less than the threshold power level in this channel "i" is selected per time period tj (Step S11 and Step S12).

Next, the interference power level $U_i$ of this channel "i" is measured (Step S13), and the measured power level $U_i$ is compared with the threshold power level "r" (Step S14).

When $U_i \geq r$ ("Yes" in Step S14), the channel having the second smaller arriving probability $W_i(t_j)$ is selected when there is any channel to be searched and the processes above are repeated.

At Step S15, When all of the channels are searched, the new channel allocation request becomes an allocation failure state (Step S17). When $U_i < r$ ("No" in Step S14), the channel is allocated (Step S18).

Thus, the channel having the smaller value $W_i(t_j)$ obtained by the study operation described above is selected according to the channel search order which has been set by the above processes.

A simulation model is provided for simulating the study search channel allocation method in the channel allocation method used for mobile type communication devices of the first embodiment. This simulation model has the circumstance where the occurrence rate of arrived interference waves is high (for example, microcells are installed at a higher floor in a building). In this simulation model, the interference has happened between the macros and microcells which use the same frequency band. The number of macrocells causing interferences to the microcells is three and the macrocells use 20 channels in the 60 channels.

Figure 8A:
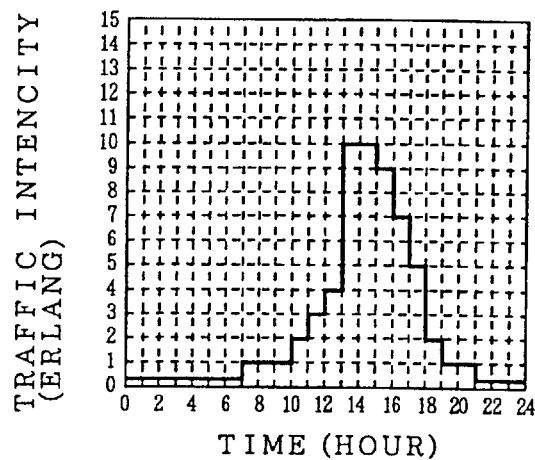
FIGS. 8A to 8C are explanation diagrams showing changes of macrocell calling patterns simulating a channel allocation method of the mobile type communication devices, as shown in FIGS. 6A and 6B, executed by a computer simulation.
Figure 8B:
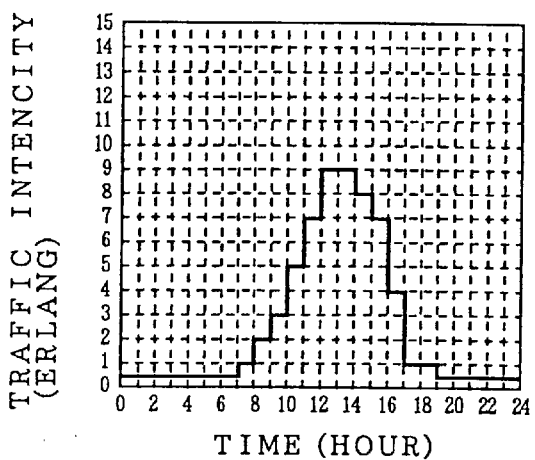
Figure 8C:
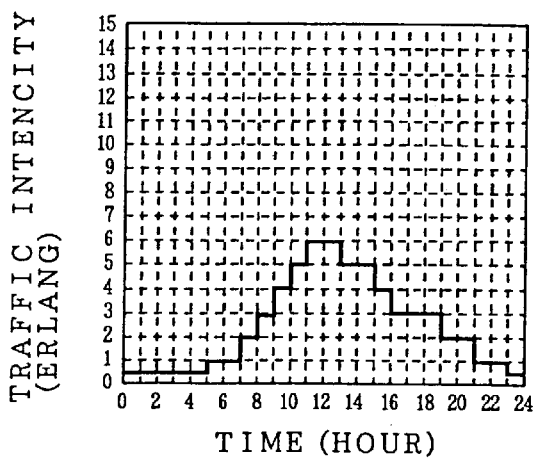

FIGS. 8A to 8C are explanation diagrams showing changes of macrocell erlang patterns simulating the channel allocation method of the first embodiment used for mobile type communication devices, as shown in FIGS. 6A and 6B, executed by a computer simulation. Thus, the change patterns of erlangs as shown in FIGS. 8A, 8B and 8C are used for this simulation.

Figure 9A:
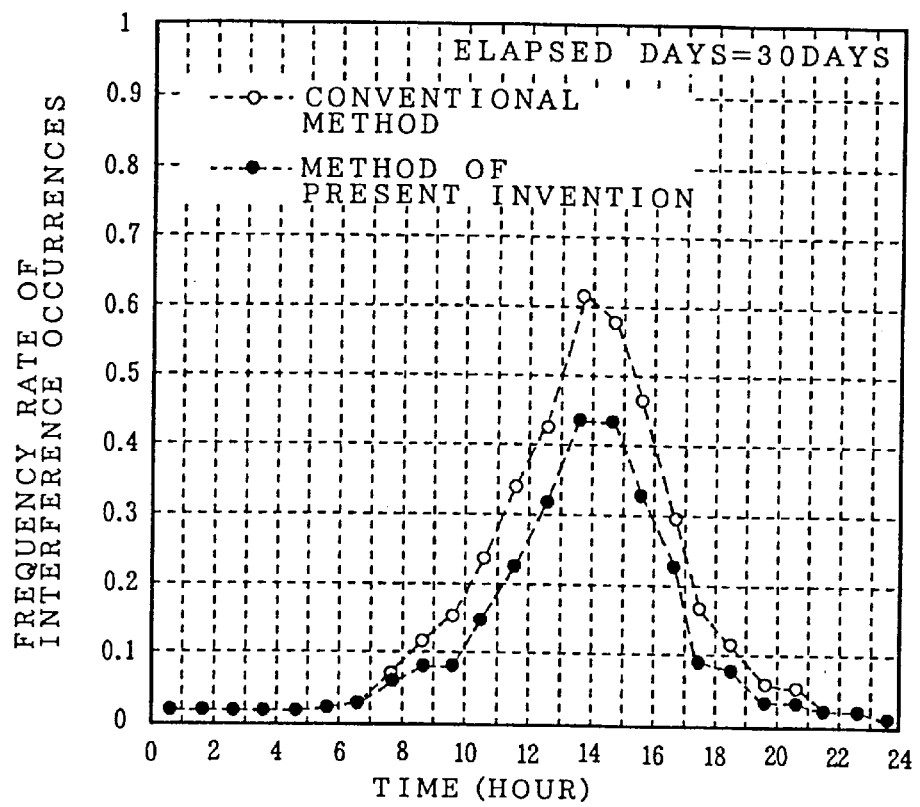
FIGS. 9A and 9B are explanation diagrams showing the simulation results detecting and indicating the efficiency of the channel allocation method used for the mobile type communication devices shown in FIGS. 6A and 6B.
Figure 9B:
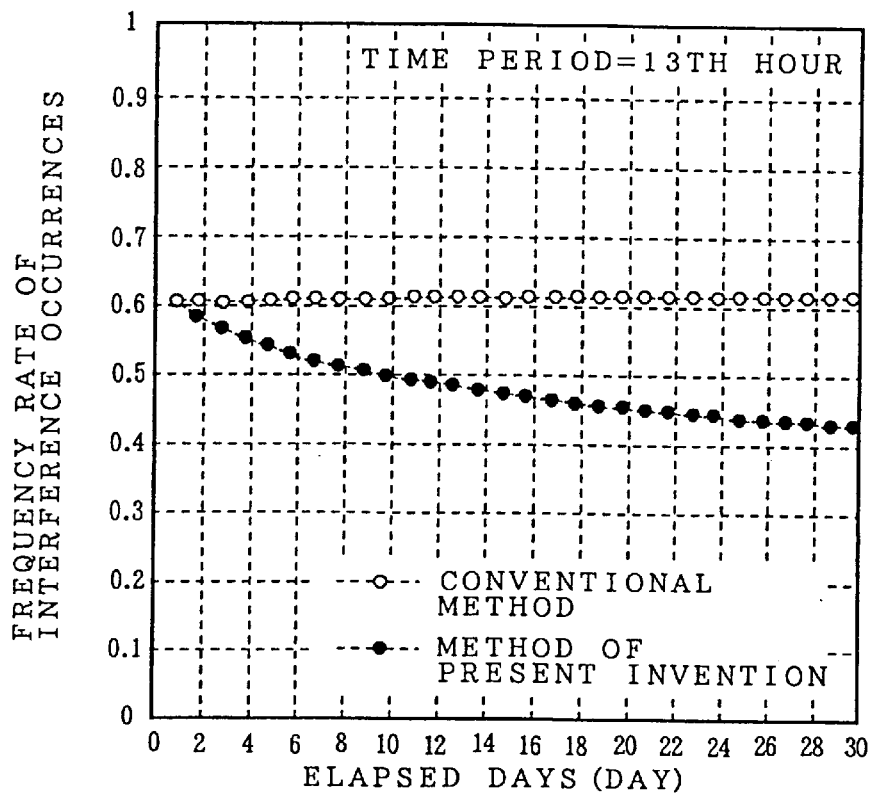

FIGS. 9A and 9B are explanation diagrams showing the simulation results detecting and indicating the efficiency of the channel allocation method of the first embodiment used for mobile type communication devices shown in FIGS. 6A and 6B.

In the simulation results obtained by the simulation described above indicating the rate of the intracell hand off start number per one calling as the interference occurrence frequencies to macrocells, as clearly shown in FIGS. 9A and 9B indicating the characteristic of a microcell after 30 days are elapsed from the start of use of it and the characteristic of the microcell at the 13th hour in a day when the number of occurrences of interferences is the maximum value in a day. When comparing to the conventional channel allocation method, the channel allocation method of the first embodiment can reduce the frequency times of the occurrences of interferences. The frequency time of the occurrences of interferences are reduced gradually every day. Further, the channel allocation method can select the channel having a relatively lower occurrence rate of interferences based on the study operation.

Embodiment 2.

Figure 10:
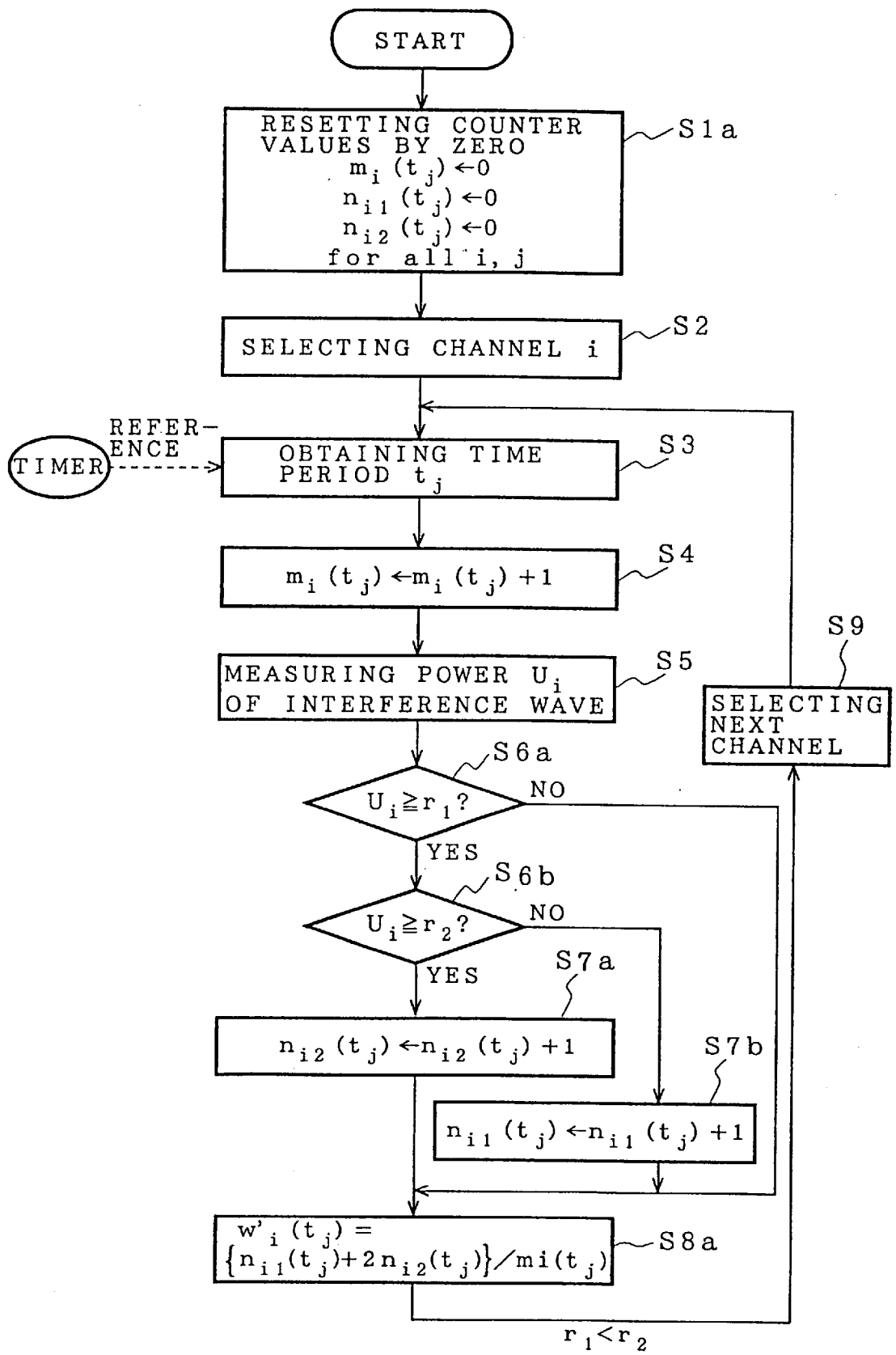
FIG. 10 is a flow chart showing the operation of a channel allocation method used for mobile type communication devices as the second embodiment of the present invention.

FIG. 10 is a flow chart showing the operation of a channel allocation method used for mobile type communication devices as the second embodiment of the present invention.

In the interference wave detection/studying processes in the channel allocation method of the first embodiment used for mobile type communication devices, as shown in FIG. 6A, the following processes are executed in order to study the change patterns of interference waves arrived from the macrocells per channel:

The arriving probability $W_i(t_j)$ indicating the probability that the interference waves each power level is not less than a threshold power level is detected for each channel and each time period.

It can also be permitted to use the channel allocation method of the second embodiment designated by the flow chart shown in FIG. 10.

In the channel allocation method of the second embodiment, a plurality of counter values each indicating the detection number of detected interference waves each having the power level of not less than a threshold power level in each time period per channel are weighted by weight operations based on the power level of each interference wave and the arriving probability $W_i(t_j)$ of interference waves each having the power level of not less than the predetermined value per channel and per time period is studied, namely stored.

Because the channel having a smaller power level of an interference wave has a smaller arriving probability $W_i(t_j)$ in the plurality of channels whose $W_i(t_j)$ are the same value, so that this channel can be selected priority. Accordingly, even if interference is happened, the degree of interferences caused by macrocells and the degree of interferences to be given to the macrocells can be reduced as small as possible.

In the interference wave detection/study processes, as shown in FIG. 10, the counter values $m_i(t_j)$, $n_{i1}(t_j)$ and $n_{i2}(t_j)$ are set by zero just before the start of the study process, like Step S1 as shown in FIG. 6A (Step S1a).

Next, Steps S2 to S4 are executed like the processes shown in FIG. 6A. Then, the power $U_i$ of an interference wave in this channel "i" is measured (Step S5), the measured result is compared with a first threshold value $r_1$ (Step S6a). When the comparison result satisfies $U_i \geq r_1$, the value $U_i$ is compared with a second threshold value $r_2$ (Step S6b). When $U_i$ $r_2$, the value of the counter $n_{i2}(t_j)$ is increased by one (Step S7a). On the other hand, when the comparison result at Step S6b satisfies $U_i < r_2$, the value of the counter $n_{i1}(t_j)$ is increased by one (Step S7b).

When $U_i < r1$ st Step S6a, the values of both the counters $n_{i1}(t_j)$ and $n_{i2}(t_j)$ are not changed.

The arriving probability $W_i'(t_j)$ of the interference wave whose level is not less than the threshold value per time period $t_j$ in the channel "i" is obtained by the following calculation (Step S8a): The added value (which is the sum of the counter value $n_{i1}(t_j)$ and the value obtained by multiplying the value of the counter $n_{i2}(t_j)$ by two) of the weighted detection numbers to detect the number of the arrived interference waves each having the interference power of not less than the threshold value in each time period tj is divided by the measurement number per channel "i" in each time period $t_j$ (the counter value $m_i(t_j)$).

Next, like the processes as shown in FIG. 6A, a next channel is selected (Step S9), the processes described above are repeated.

In the channel allocation method of the second embodiment described above, the counter $n_{i2}(t_j)$ storing the detection number to detect the arriving times of the interference waves each having a larger power level is weighted according to the power level of the interference wave by a weight which is larger than the weight value used for the value of the counter $n_{i1}(t)$.

Although the rate of the weighted counter values is 1:2 in the explanation described above, but the present invention is not limited by this rate, for example it is also permitted to use the rate of the weighted counter values is 1:3, or 0.5:1, and so on, where the channel in which the power level of an arrived interference wave is larger has a larger $W_1'(t_j)$. In addition, it is also acceptable to use the number of weight values of more than two and the number of the counters of more than two in order to study the change patterns of arrived interference waves accurately.

Embodiment 3.

Figure 11A:
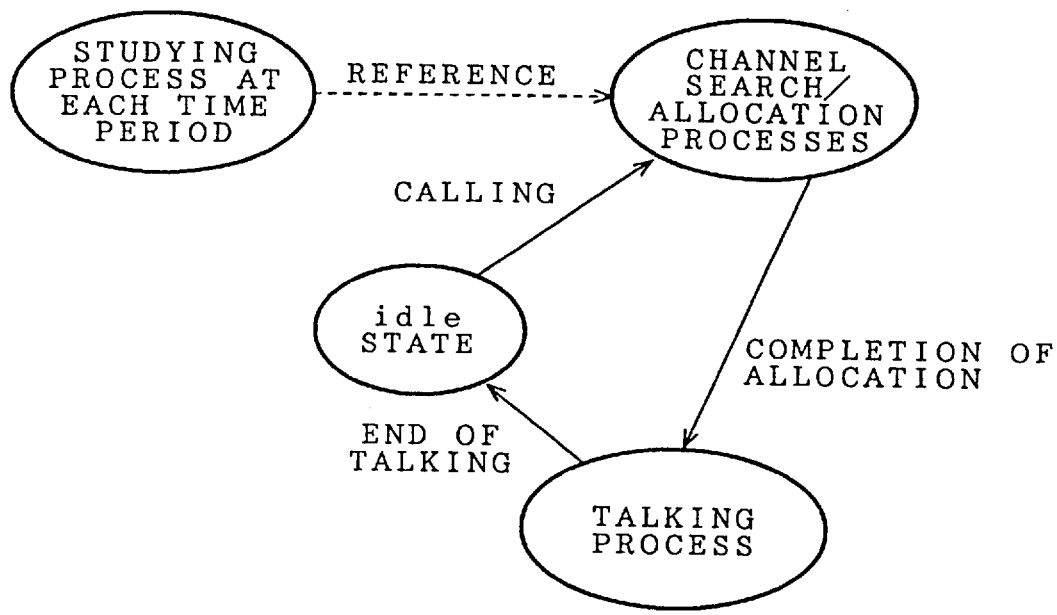
FIGS. 11A and 11B are explanation diagrams showing a study function during an idle state in a channel allocation method used for mobile type communication devices as the third embodiment of the present invention.
Figure 11B:
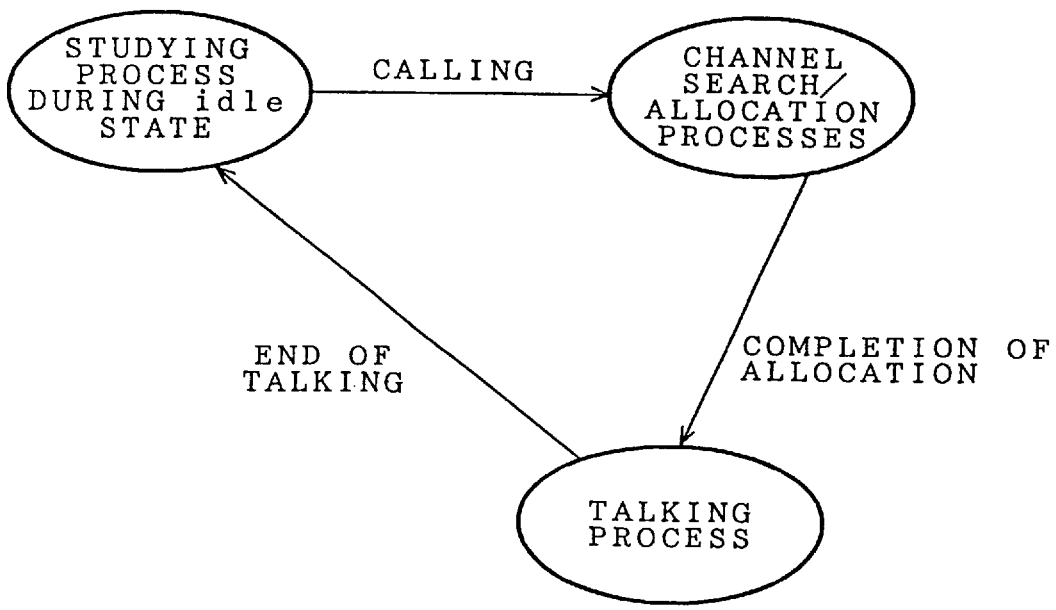

FIGS. 11A and 11B are explanation diagrams showing a study function during an idle state in the channel allocation method used for mobile type communication devices as the third embodiment of the present invention.

In the interference wave detection/study processes in the channel allocation methods of the embodiments used for mobile type communication devices as shown in FIG. 6A and FIG. 10, in order to study and store the change patterns of interference waves within a short time period, it must be executed per constant time interval during talking as shown in FIG. 11A. Instead of this process, as shown in FIG. 11B, it is acceptable to execute the interference wave detection/study processes in an idle state after the channel allocation and the talking process is completed. Thereby, the interference wave detection/ study processes is interrupted temporally when a callings is occurred, and the process is restarted after the completion of the talking. Further, when the number of callings is increased, it can be possible that the interference wave detection/study processes is executed for a part of all of the channels. Thereby, a microcell station can easily be constructed because one receiver is commonly used for talking and the detection operation to detect interference waves.

Furthermore, it can be possible to use a following method instead of the interference wave detection/study processes shown in FIG. 6A and FIG. 10:

When the change pattern of the interference wave arrived from macrocells changed in season is studied for each channel, the counter $n_i(t_j)$ stores the value obtained by multiplying the detection number by an elimination coefficient (or forgetting factor), instead of that the counter $n_i(t_j)$ stores only added detection numbers obtained by detecting the interference waves each having the power level of not less than a threshold value in each channel. This elimination coefficient reduces the magnitude of the value which has been stored in the counter $n_i(t_j)$ at relatively past time.

By using this channel allocation method, even if the change pattern of interference waves arrived from macrocells is changed, this method can easily trace the change.

At the updating process for the counter $n_i(t_j)$ in Step S7 shown in FIG. 6A and in Step S7a and Step S7b shown in FIG. 10 described above, the counter $n_i(t_j)$ stores the value obtained by multiplying the value of the counter $n_i(t_j)$ by the elimination coefficient (or the forgetting factor) at the updating process for the value of the counter $n_i(t_j)$. In order to execute this updating process, the processes at Step S7 shown in FIG. 6a or at Step S7a and Step S7b shown in FIG. 10 are replaced with the following processes:

$n_i(t_j) \leftarrow \alpha n_i(t_j) + 1 (\alpha < 1)$ instead of Step S7 shown in FIG. 6A; or $n_{i1}(t_j) \leftarrow \alpha n_{i1}(t_j) + 1 (\alpha < 1)$ and $n_{i2}(t_j) \leftarrow \alpha n_{i2}(t_j) + 1 (\alpha < 1)$ instead of Step S7a and Step 7b shown in FIG. 10.

For example, when a=0.9, the values of the counter $n_{1i}(t_j)$ at the last updating process and at the last updating process before the last updating process become 0.9 and 0.9×0.9= 0.81, respectively. Thus, the value in the counter $n_i(t_j)$ is smaller when the time performing the updating process is older, so that the influence of the value stored in the counter $n_i(t_j)$ that has been stored in a past time can be reduced.

Embodiment 4.

Figure 12A:
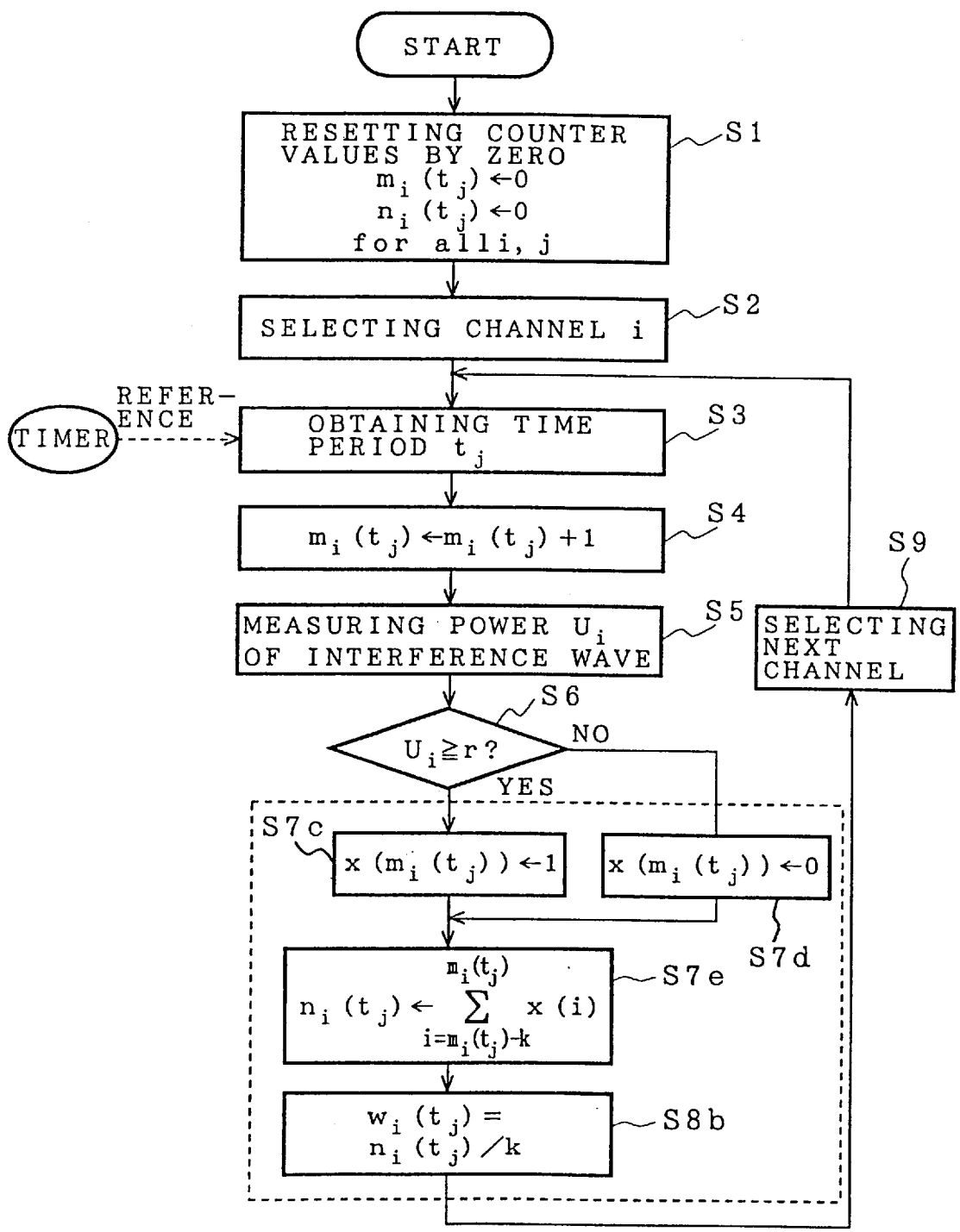
FIGS. 12A and 12B are flow charts showing the operation of channel allocation method used for mobile type communication devices and a hardware component used for the channel allocation method as the fourth embodiment of the present invention.
Figure 12B:
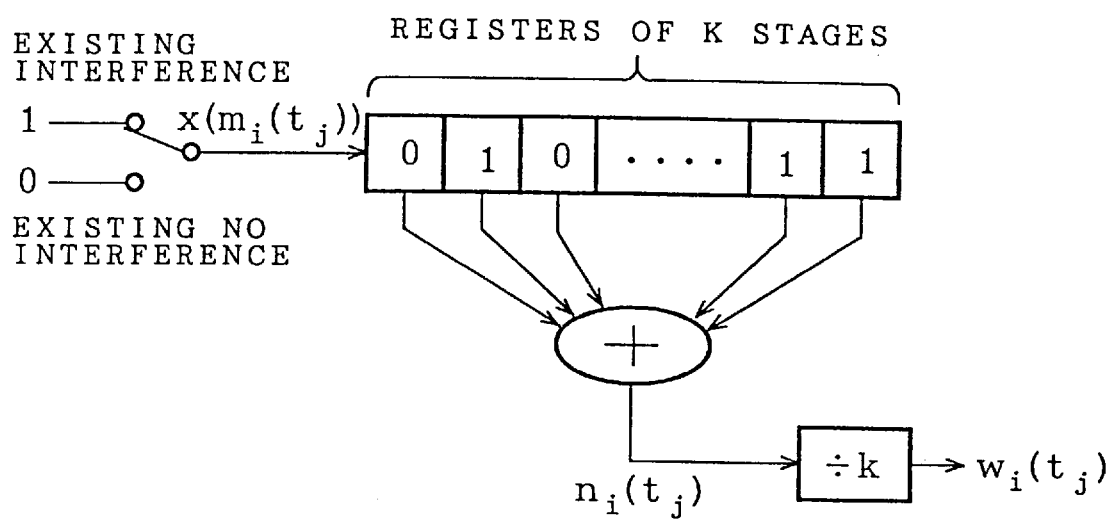

FIGS. 12A and 12B are flow charts showing the operation of a channel allocation method used for mobile type communication devices and a hardware component used for the channel allocation method as the fourth embodiment of the present invention.

In the interference wave detection/study processes in the channel allocation methods of the embodiment used for mobile type communication devices as shown in FIG. 6A, it can be permitted to use a following method instead of the interference wave detection/study processes shown in FIG. 6A:

As shown in FIG. 12, when the change pattern of the interference wave arrived from macrocells changed in season is studied for each channel, the process that reduces the values which has been stored into the counter $n_i(t_j)$ at a relatively old time is executed and the value is stored into the counter $n_i(t_j)$ only for a predetermined time period, instead of that the counter $n_i(t_j)$ stores only added detection numbers obtained by detecting the interference waves each having the power level of not less than a threshold value in each channel.

By using this channel allocation method of the fourth embodiment, even if the change pattern of interference waves arrived from macrocells is changed, this method can easily trace the change.

In the interference wave detection/study processes of the fourth embodiment as shown in FIG. 12, the values counted in past k times from the present time are stored in the counter $n_i(t_j)$, instead of the updating process of the counter $n_i(t_j)$ shown in Step S7 and Step S8 shown in FIG. 6A and the calculation process of the arriving probability $W_i(t_j)$ of the interference waves having the power level of not less than a threshold value "r" in each time period and per channel.

When the power of the interference wave $U_i \geq r$ (Step S6) or when $U_i < r$, a resistor $x(m_i(t_j))$ is set by zero or 1 (Step S7c, Step S7d) corresponding to the measured times per channel "i" in each time period $t_j$, and then the value obtained by adding the counted values from the present time to the last k times and the added counted values is stored into the counter $n_i(t_j)$ (Step S7e).

Next, as shown in FIG. 12B, the value of the counter $n_i(t_j)$ obtained by adding the value stored in the register having "k" stages to which 1 or 0 is stored based on the conditions that there is any interference $(U_i \geq r)$ or there is no interference $(U_i < r)$ is divided by the number of stages of the register in a moving average process in order to obtain the $W_i(t_j)$ (Step S8b).

In addition, it can also be acceptable to apply the updating process of the counter values $n_{i2}(t_j)$ and $n_{i1}(t_j)$ and the calculation process of the value $W_i'(t_j)$ shown in Step 7a, Step S7b and Step S8a to the channel allocation method used for mobile type communication devices shown in FIG. 12A. Embodiment 5.

Figure 13A:
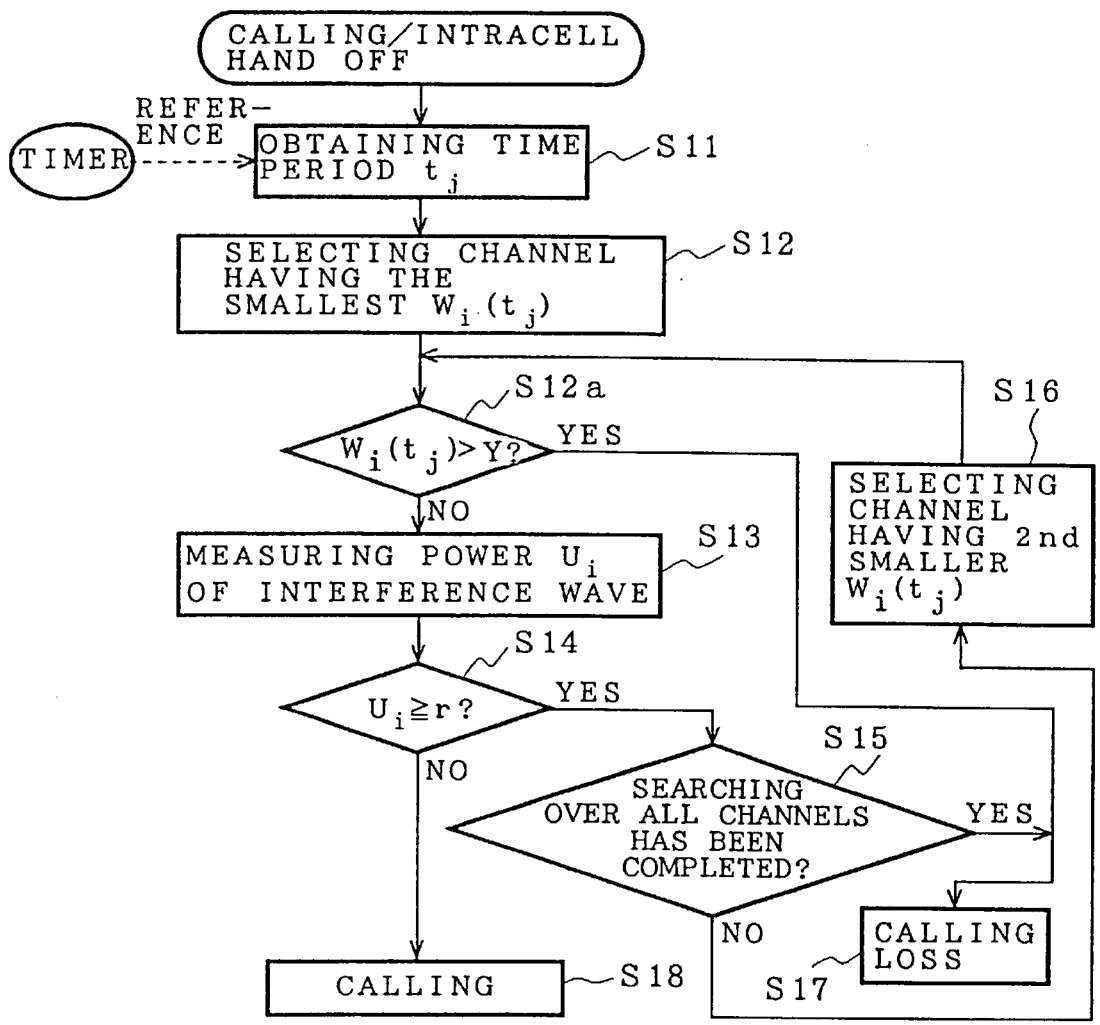
FIGS. 13A and 13B are flow charts showing the operation of a channel allocation method used for mobile type communication devices as the fifth embodiment of the present invention.
Figure 13B:
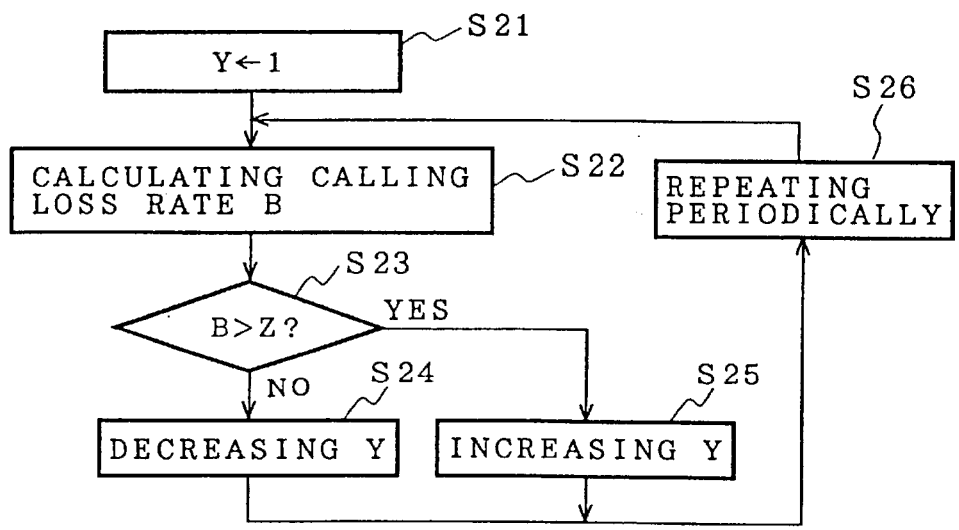

FIGS. 13A and 13B are flow charts showing the operation of a channel allocation method used for mobile type communication devices as the fifth embodiment of the present invention.

It can be permitted to use a following method when interference waves are often arrived in a channel (for example, it is often happened after the channel allocation, not before the channel allocation.), instead of the channel search/allocation processes in the channel allocation method of the first embodiment used for mobile type communication devices as shown in FIG. 6B:

When a channel having the arriving probability $W_i(t_j)$ of interference waves arrived from macrocells that is not less than a predetermined probability value "Y", this channel is eliminated from the channel allocation process according to the state of occurrence of blocking (calling loss).

By using this method, it can be avoided to allocate the channel to which interference waves are often arrived from macrocells and it can be achieved to avoid the intracell handoff, i. e. the change of the current channel to another channel during talking.

Therefore it can be possible to obtain a desired calling loss rate (blocking probability) and to reduce the interference occurrence rate.

As shown in the flow chart of FIG. 13A, the channel search/allocation processes of the fifth embodiment is following:

At Step S12a shown in FIG. 13A, the value $W_i(t_j)$ is compared with the predetermined arriving provability Y per time period $t_j$ between the channel having the smallest $W_i(t_j)$ is selected (Step S12) and the power level $U_i$ of the interference waves is measured (Step S13). When the comparison result is $W_i(t_j) > Y$, this channel is eliminated from channel allocation and the calling loss is occurred (Step S17).

Here, the value Y is set by a predetermined initial value, as shown in FIG. 13B, the calling loss rate (blocking probability) B that is calculated by using channel allocation results that have already been executed is compared with a predetermined calling loss rate Z (Step S23), the value Y is increased (Step S25) when B>Z, and the value Y is decreased (Step S24) when B≦Z. These processes are repeated (Step S26) so as to reduce the value Y within the channel allocation quality having a satisfied calling loss Z. Embodiment 6.

Figure 14A:
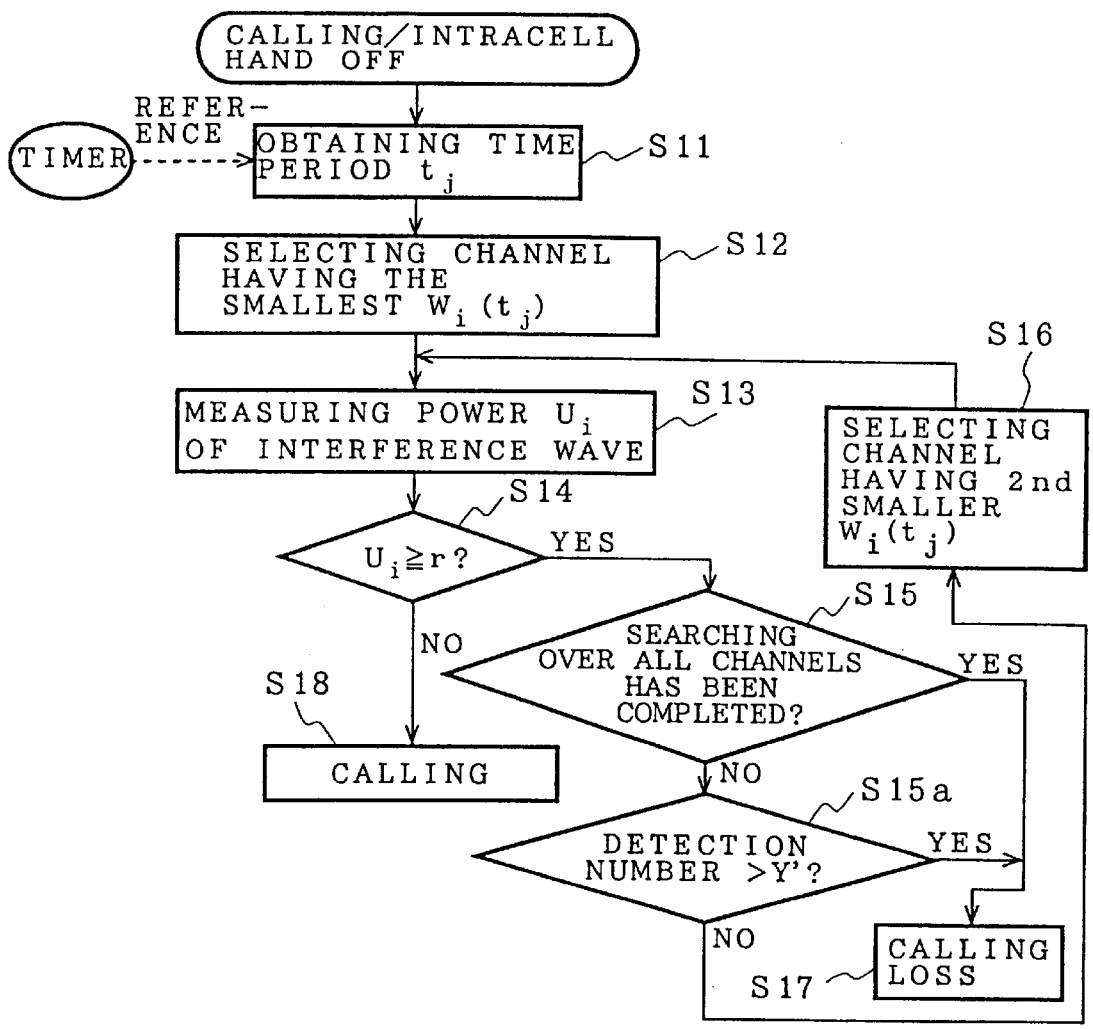
FIGS. 14A and 14B are flow charts showing the operation of a channel allocation method used for mobile type communication devices as the sixth embodiment of the present invention.
Figure 14B:
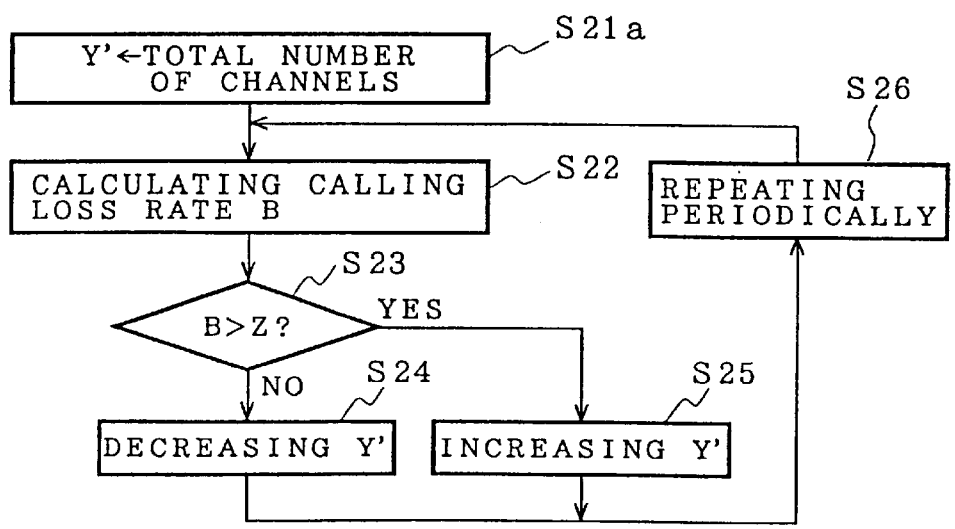

FIGS. 14A and 14B are flow charts showing the operation of a channel allocation method used for mobile type communication devices as the sixth embodiment of the present invention.

It can be possible to use a following method, when an interference wave is arrived to a channel, instead of the channel search/allocation processes in the channel allocation method of the first embodiment used for mobile type communication devices as shown in FIG. 6B:

A channel having the number of search processes each having not less than the predetermined maximum search value Y' according to the calling loss occurrence state is eliminated from the channel allocation.

This method can get the same effect of the channel allocation method used for mobile type communication devices shown in FIG. 13A.

As shown in FIG. 14A, in the channel search/allocation processes, the number of search processes are compared with the predetermined maximum search number Y' (Step S15a) in the search processes over all of the channels. If there is no channel after the search process is executed at the Y' times, this becomes the calling loss (Step S17).

As shown in FIG. 14B, first of all, the value Y' is set by the number of all channels (Step S21a) in order to search all of the channels, when the calling loss rate B is compared with the predetermined calling loss rate Z (Step S23). The value Y' is increased (Step S25) when B>Z (Step S23). The value Y' is decreased (Step S24) when B≦Z (Step S23). These processes are repeated (Step S26) so as to reduce the value Y' within the channel allocation quality having a satisfied calling loss Z. In this case, because a channel has larger value $W_i(t_j)$ when the number of searching processes in the channel is increased, the channel having the large value $W_i(t_j)$ is eliminated from the channel allocation.

As described above in detail, since the characteristics of interference waves arrived from macrocells are studied and a channel to be allocated or assigned is searched according to the channel search order that has been set in the channel allocation method of the present invention, the channel allocation method of the present invention has the effect that the occurrences of interferences to macrocells can be reduced without eliminating channels to be allocated under a circumstance where the number of the occurrences of interferences is high (the higher interference condition). Therefore the effect of the channel allocation method of the present invention is superior to the conventional channel allocation methods (1) to (5) described above: (1) The reuse channel fixed allocation method; (2) The interference avoidance channel allocation method; (3) The priority channel allocation method; (4) The channel allocation method in which any channel of the occurrence of interference is eliminated for channel allocation; and (5) the channel allocation method in which the interference in a channel is happened at more than predetermined times is eliminated for channel allocation.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A channel allocation method used for mobile type communication devices in a system including a plurality of macrocells and microcells both use a same frequency band divided into a plurality of channels, comprising:
an interference wave detection/study step of studying characteristics of interference waves arrived from said macrocells per channel based on a channel search order which is determined based on said characteristics of arrived interference waves and of allocating one of said channels,
wherein said interference wave detection/study process a power of said interference wave is measured per channel and per time period a data update operation is repeated to obtain a detection number count value, and weighting an arriving probability based on the detection number count value counted by the repeating of the data update operation by a predetermined weight value based on the magnitude of the power of the interference wave studied as the characteristic of the arrived interference waves.

2. A channel allocation method as claimed in claim 1, wherein said data update operation is repeated to obtain a detection number count value when a power level of said arrived interface wave is not less than a predetermined power level.

3. A channel allocation method as claimed in claim 2, wherein in said channel search/allocation process, a channel has an arriving probability of said interference wave arrived from other macrocells that is not less than a predetermined probability value, said channel being eliminated from the channel allocation process according to the state of occurrence of calling loss.

4. A channel allocation method as claimed in claim 1, wherein in said interference wave detection/study process, a data update operation is repeated to obtain a detection count value only in a desired time period when a power level of said arrived interference wave is not less than a predetermined power level.

5. A channel allocation method as claimed in claim 4, wherein in said interference wave detection/study process, said characteristic of said arrived interference wave is detected in a predetermined time period over all of said channels, or at a desired time for specified channels in said plurality of channels.

6. A channel allocation method as claimed in claim 4, wherein in said channel search/allocation process, a channel has an arriving probability of said interference wave arrived from other macrocells that is not less than a predetermined probability value, said channel being eliminated from the channel allocation process according to the state of occurence of calling loss.

7. A channel allocation method as claimed in claim 1, wherein in said interference wave detection/study process, said characteristic of said arrived interference wave is detected in a predetermined time period over all of said channels, or at a desired time per specified channels in said plurality of channels.

8. A channel allocation method as claimed in claim 1, wherein in said channel search/allocation process, a channel has an arriving probability of said interference wave arrived from other macrocells that is not less than a predetermined probability value, said channel being eliminated from the channel allocation process according to the state of occurrence of calling loss.

9. A channel allocation method as claimed in claim 8, wherein the number of searchings is used instead of said arriving probability of said interference wave.

10. A channel allocation method, used for mobile type communication devices in a system including a plurality of macrocells and microcells both use a same frequency band divided into a plurality of channels comprising:
an interference wave detection/study step of studying characteristics of interference waves arrived from said macrocells per channel based on a channel search order which is determined based on said characteristics of arrived interference waves and of allocating one of said channels wherein in said interference wave detection/study process, a power of said interference wave is measured per channel and per time period, and a data update operation is repeated to obtain a detection number count value when a power level of said arrived interference wave is not less than a predetermined power level, and an arriving probability based on said detection number count value counted by the repeating of said data update operation is weighted by a predetermined weight value based on a magnitude of said power of said interference wave studied as the characteristic of said arrived interference waves.

11. A channel allocation method as claimed in claim 10, wherein in said interference wave detection/study process, a power of said interference wave is measured per channel and per time period, and a data update operation is repeated to obtain a detection number count value only in a desired time period when a power level of said arrived interference wave is not less than a predetermined power level.

12. A channel allocation method as claimed in claim 10, wherein in said interference wave detection/study process, said characteristic of said arrived interference wave is detected in a predetermined time period over all of said channels, or at a desired time for specified channels in said plurality of channels.

13. A channel allocation method as claimed in claim 10, wherein in said channel search/allocation process, a channel has an arriving probability of said interference wave arrived from other macrocells that is not less than a predetermined probability value, said channel being eliminated from the channel allocation process according to the state of occurrence of calling loss.

14. A channel allocation method used for mobile type communication devices in a system including a plurality of macrocells and microcells both use a same frequency band divided into a plurality of channels, comprising:

an interference wave detection/study step of studying characteristics of interference waves arrived from said macrocells per channel based on a channel search order which is determined based on said characteristics of arrived interference waves and of allocating one of said channels wherein in said interference wave detection/study process, a power of said interference wave is measured per channel and per time period, and a data update operation is repeated to obtain a detection count value only in a desired time period when a power level of said arrived interference wave is not less than a predetermined power level, wherein said detection number count value is obetained by multiplying said detection number count value in current state by a predetermined value as a forgetting factor.

* * * * *